Aug. 14, 1951  R. NAGY ET AL  2,563,901
PHOSPHOR AND METHOD OF MAKING
Filed May 15, 1948

INVENTORS
RUDOLPH NAGY
R. W. WOLLENTIN
BY
ATTORNEY

Patented Aug. 14, 1951

2,563,901

UNITED STATES PATENT OFFICE 2,563,901

PHOSPHOR AND METHOD OF MAKING

Rudolph Nagy and Robert W. Wollentin, Bloomfield, N. J., assignors to Westinghouse Electric Corporation, East Pittsburgh, Pa., a corporation of Pennsylvania Application May 15, 1948, Serial No. 27,164

17 Claims. (Cl. 176—122)

This application is a continuation in part of our application Serial No. 756,242, filed June 21, 1947, and owned by the assignee of the present application.

This invention relates to phosphors and methods of making and, more particularly, to a phosphor having a large response in the erythemal region of the spectrum.

The principal object of our invention, generally considered, is to produce an efficient phosphor whose peak of emission is near that of the erythemal spectrum, say at about 3190 A. U., whereby it has a greater erythemal response than thallium-activated calcium phosphate phosphor.

Another object of our invention is to produce a thallium-activated solid solution of magnesium and calcium phosphates, particularly useful for the production of erythemal radiations.

A further object of our invention is to add an ingredient to thallium-activated calcium phosphate which will shift the peak of the emission about 100 A. U. toward the shorter wave lengths, thereby increasing its efficiency for producing erythemal radiations.

A still further object of our invention is to produce a fluorescent lamp adapted to generate erythemal radiations at high efficiency, for example, many times the erythemal effect per watt as filament-ballasted discharge-devices commonly called RS sun-lamps, and which phosphor has better maintenance than those formerly employed for the purpose.

Other objects and advantages of the invention will become apparent as the description proceeds.

Referring to the drawing.

Figure 2:
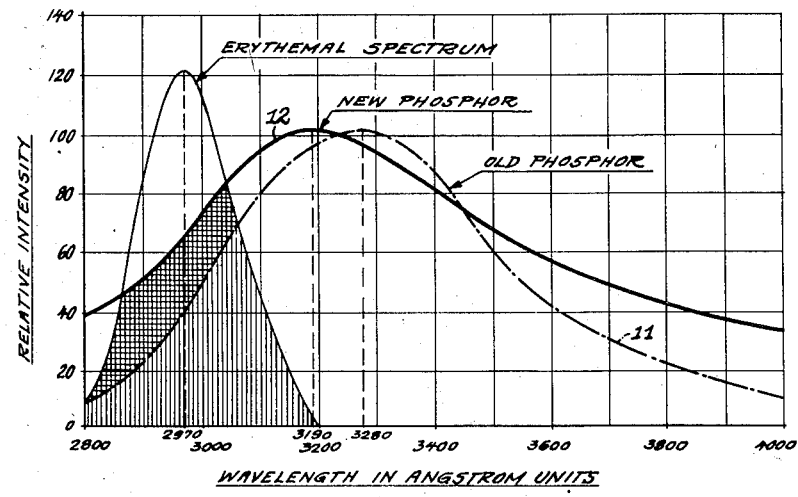
Figure 2 is a diagram showing the relationship between the fluorescent response of a phosphor embodying our invention, the phosphor previously used for the purpose, and the erythemal spectrum, the ordinates of the erythemal curve showing relative erythemal effectiveness over the range of wave-lengths covered.

The sunlamp phosphor previously generally used for the purpose of producing erythemal radiations is calcium ortho phosphate activated with thallium. The emission spectrum of this phosphor has a peak at about 3280 A. U. and the curve thereof is designated by the reference character $11$ in Figure 2. The efficiency of this phosphor is low, because only a small portion of the emitted fluorescence falls within the accepted erythemal region. We have been able to produce a new phosphor, the curve of emission formation of which is represented by the reference character $12$ in Figure 2, where the peak of emission is at about 3190 A. U. In this way, we obtain about 50% more erythemal response from our phosphor than from thallium-activated calcium phosphate.

In the preparation of our phosphor, we produce a solid solution of magnesium and calcium ortho phosphates activated with thallium. The magnesium can be in the form of the oxide, carbonate, phosphate, or other salt decomposing to the oxide. The calcium reacts best when in the form of the oxide or carbonate, but any other pure calcium salt decomposable to the oxide can be used. The phosphate radical is best supplied by the compound di-ammonium acid phosphate, because of its great purity, but other salts such as calcium acid phosphate have also been found to be usable. Following are two procedures for using a formula, given below, to produce a good phosphor.

Formula I

| Constituents: | Moles |
|---|---|
| $Mg_3(PO_4)_2$ | .608 |
| $CaCO_3$ | 14.510 |
| $(NH_4)_2HPO_4$ | 9.670 |
| $Tl_3PO_4$ | .173 |

In producing the phosphor from the above formula, the first three ingredients are finely ground and thoroughly mixed for two hours, desirably by ball-milling, and then fired at 300° C. It is best to regrind the heated mass and put through a 100 mesh sieve before heating for a second time at 300° C. The thallium ortho phosphate, or any other thallium salt decomposable to the oxide in corresponding mole proportion, is desirably added to the finely-powdered magnesium calcium ortho phosphate so produced and thoroughly mixed, desirably in an agate mortar. The firing temperature is then desirably raised to 950° C. and the sample heated for one half hour. The phosphor is then preferably reground, sieved, and refired for about 20 minutes. The process of refiring and sieving is then desirably repeated at least two times, or until the highest output is obtained.

During the firing, only the carbon dioxide, ammonia, water, and part of the thallium are removed by vaporization. Enough thallium remains, as only a very small proportion is needed for activation, as in connection with the formation of thallium-activated calcium orthophosphate, disclosed in the Roberts Patent No. 2,447,210. This, of course, means that by condensing the CaCO3 and (NH4)2HPO4 to Ca3(PO4)2, the mole ratio is divided by three.

If it is desired to eliminate the use of the di-ammonium acid phosphate, Formula I would become the following.

*Formula II*

| Constituents: | Moles |
|---|---|
| Mg3(PO4)2 | .608 |
| Ca3(PO4)2 | 4.84 |
| Tl3(PO4) | .173 |

It will be understood, however, that as before other salts may be substituted for the thallium phosphate.

Although it will be understood that the proportions given in Formulas I and II, as well as in Formula III to follow, are optimum, yet moderate variations are permissible within the scope of the invention. For example, the mole proportion of the magnesium compound may vary between .3 and 1.0.

Figure 1:
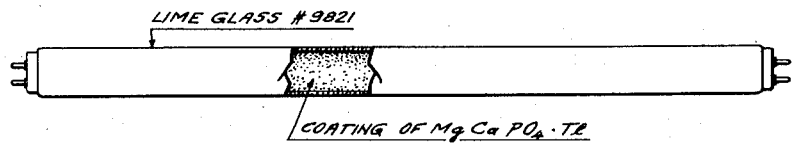
Figure 1 is an elevational view with a part in longitudinal section of a fluorescent lamp embodying our invention.
Figure 3:
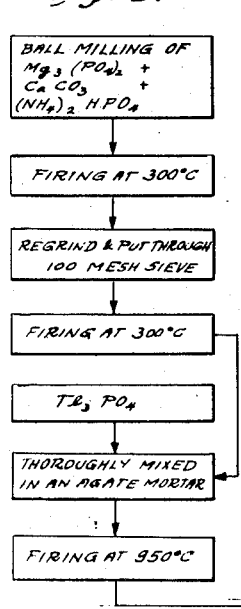
Figure 3 is a flow diagram illustrating one embodiment of our method.
Figure 4:
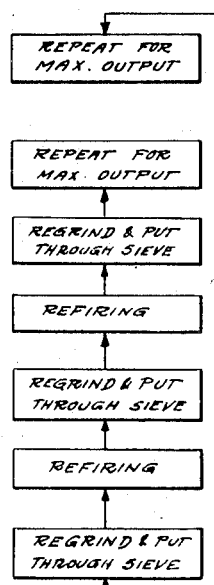
Figure 4 is a flow diagram illustrating another embodiment of our method.

Instead of following the above procedure, which is represented by the flow diagram of Figure 3, we may finely grind and thoroughly mix, as by ball-milling, all the ingredients together, with a .95 mole excess of ammonium phosphate. The heating of the ingredients is desirably done at about 950° C. for one-half hour, and then the mixture is ground and sieved. The process of heating and grinding is continued at 15 minute intervals until the highest or optimum output is obtained. This alternative procedure is represented by the flow diagram of Figure 4. Figure 1 represents a fluorescent lamp using a phosphor of our invention.

Instead of representing the ingredients in mole proportions, we may make a batch of the 8% tertiary magnesium calcium phosphate phosphor, about as above represented, the total of which weighs a little more than a kilogram after firing, by mixing ingredients in the following proportions:

*Formula III*

| Constituents: | Grams or parts by weight |
|---|---|
| Mg3(PO4)2 | 165 |
| CaCO3 | 1,451 |
| (NH4)2HPO4 | 1,277 |

The above ingredients should be ball-milled, or otherwise finely ground and thoroughly mixed, for about two hours and fired at 300° C. in a shallow silica tray, say approximately 5" x 14" x 1½"

deep. The material may then be ball-milled for one half hour, refired at 300° C. for one hour, and then ball-milled for one hour with an admixture of 129 grams of thallium sulphate, Tl2SO4, or the corresponding mole proportion of thallium ortho phosphate. The mixture may then be fired at 950° C. for about ¾ hour, and refired a number of times for 15 minute intervals, preferably with grinding between intervals of heating.

Although, we have specified a preferred proportion of tertiary magnesium phosphate or magnesium ortho phosphate of about 8% in the finished phosphor, yet we do not wish to be limited to this, as we may get a desirable shift toward the shorter wave lengths by adding varying proportions of such phosphate to the other ingredients. Said proportions may vary, for example, between 4% and 12% of the finished phosphor.

In using magnesium phosphate, however, we have found that the optimum amount appears to be about 8%, with which the emission peak was shifted to 3190 A. U.

From the foregoing, it will be seen that we have produced an improved phosphor in which the emission spectrum is shifted to such an extent toward the shorter wave lengths, that it is more efficient for the production of erythema, as well as providing a considerable proportion of bactericidal energy. Lamps such as shown in Figure 1 and made with it have better maintenance, and produce only a very small proportion of visible radiation and a much higher output in the erythemal region than lamps made with the regular calcium thallium phosphate phosphor. This means that such a 40 watt fluorescent lamp with suitable electrodes, as illustrated in the parent case, located at the ends of the sealed envelope made of a lime glass, such as Corning Code No. 9821, for example, which transmits the erythemal radiations of wave-lengths longer than 2600 A. U. but is impermeable to radiations of shorter wave-lengths, sustains therebetween a low-pressure positive column discharge through the usual fluorescent lamp filling of argon and mercury vapor, whereby to generate an abundance of short wave-length radiations, including 2537 A. U. wave-length. The internal surface of the envelope is provided with a coating of the novel phosphor, as here disclosed, and this when excited by the generated radiations, emits a large amount of radiations in the erythemal range between below 2800 and 3200 A. U. Thus such a lamp produces many times the erythemal effect per watt as the filament-ballasted so-called RS sunlamp, as manufactured by the assignee of the present application.

Although preferred embodiments of our invention have been disclosed, it will be understood that modifications may be made within the spirit and scope of the appended claims.

We claim:

1. A phosphor having a high output in the erythemal region and only a very small output of visible radiations, consisting essentially of a thallium-activated phosphate of calcium with from 4% to 12% of magnesium phosphate in solid solution, and having its peak of emission at about 3190 A. U.

2. A phosphor for fluorescent lamps consisting of the fired reaction product of the following constituents in about the following proportions: tertiary magnesium phosphate, .608 mole; calcium carbonate, 14.51 moles; di-ammonium acid phosphate, 9.67 moles; and tertiary thallium phosphate, .173 mole.

3. A phosphor for fluorescent lamps consisting of the fired reaction product of the following constituents in about the following proportions by weight: tertiary magnesium phosphate, 165 parts; calcium carbonate, 1451 parts; di-ammonium acid phosphate, 1277 parts; and thallium sulphate, 129 parts.

4. The method of making a phosphor with a high output in the erythemal region and only a very small output of visible radiations, comprising ball-milling together .608 mole of tertiary magnesium phosphate, 14.51 moles of calcium carbonate, and 9.67 moles of di-ammonium acid phosphate for two hours, firing at 300° C., regrinding the heated mass and putting it through a 100 mesh sieve, firing, heating a second time at 300° C., adding .173 mole of tertiary thallium phosphate, thoroughly mixing, raising the firing temperature to 950° C. for one half hour, regrinding, sieving, refiring for 20 minutes, regrinding, sieving, refiring, sieving, and continuing until the maxmum output is obtained.

5. The method of making a phosphor with a high output in the erythemal region and only a very small output of visible radiations, comprising ball-milling together .608 mole of tertiary magnesium phosphate, 14.51 moles of calcium carbonate, 10.62 moles of di-ammonium phosphate, .173 mole of thallium phosphate, heating at 950° C. for one half hour, grinding, sieving, reheating, grinding, sieving, and repeating the heating and grinding at 15 minute intervals until the maximum output is obtained.

6. The method of making a phosphor with a high output in the erythemal region and only a very small output of visible radiations, comprising ball-milling together 165 parts of tertiary magnesium phosphate, 1451 parts of calcium carbonate, 1277 parts of di-ammonium acid phosphate for two hours, firing at about 300° C. in a shallow silica tray, ball-milling for about one half hour, refiring at 300° C. for one hour, and ball-milling for one hour with an admixture of 129 grams of thallium sulphate, firing the mixture at 950° C. for ¾ hour, and refiring a number of times for 15 minute intervals until the maximum output is obtained.

7. A phosphor for fluorescent lamps consisting of the fired reaction product of the following constituents in about the stated proportions: calcium carbonate, 14.51 moles, di-ammonium acid phosphate, 9.67 moles, tertiary thallium phosphate, .173 mole, and enough tertiary magnesium phosphate to make from 4% to 12% by weight of the finished phosphor.

8. A phosphor for fluorescent lamps consisting of the fired reaction product of the following constituents in about the following proportions by weight: calcium carbonate, 1451 parts, di-ammonium acid phosphate, 1277 parts, thallium sulphate, 129 parts, and enough tertiary magnesium phosphate to make from 4% to 12% by weight of the finished phosphor.

9. A fluorescent composition of unfused and unsintered calcium magnesium orthophosphate forming a phosphor matrix, containing a minor proportion of thallium in activating combination with the phosphate structure, the magnesium orthophosphate being from 4% to 12% of the composition, and when subjected to 2537 A. U. radiation emitting radiation that extends from below 2800 A. U., with a peak at about 3190 A. U. to 4,000 A. U., and is rich in erythemal energy with wave-lengths from below 2800 A. U. to 3200 A. U., but essentially free of visible luminescence.

10. A phosphor for fluorescent lamps, having a high output in the erythemal region, only a very small output of visible radiations, and a peak of emission at about 3190 A. U., consisting of the fired reaction product of the following constituents: calcium carbonate, di-ammonium acid phosphate to form therewith calcium phosphate, an activating proportion of thallium sulphate, and enough tertiary magnesium phosphate so that it appears in said phosphor in solid solution as from 4% to 12% thereof.

11. The method of making a phosphor with a high output in the erythemal region, only a very small output of visible radiations, and a peak of emission at about 3190 A. U., comprising grinding together calcium carbonate, di-ammonium acid phosphate to form therewith calcium phosphate, and enough tertiary magnesium phosphate so that it appears as from 4% to 12% in solid solution in the phosphor produced, firing at 300° C. regrinding the heated mass and putting it through a sieve, firing by heating a second time at 300° C., adding an activating proportion of tertiary thallium phosphate, thoroughly mixing, raising the firing temperature to 950° C. for one half hour, regrinding, sieving, refiring for 20 minutes, regrinding, sieving, refiring, sieving, and continuing until the maximum output is obtained.

12. The method of making a phosphor with a high output in the erythemal region, only a very small output of visible radiations, and a peak of emission at about 3190 A. U., comprising grinding together calcium carbonate, an activating proportion of tertiary thallium phosphate, about 10% excess of ammonium phosphate, and enough tertiary magnesium phosphate so that it appears as from 4% to 12% in solid solution in the phosphor produced, heating at 950° C. for about one half hour, grinding, sieving, heating, grinding and sieving, and continuing the heating and grinding for 15 minute intervals until the maximum output is obtained.

13. The method of making a phosphor with a high output in the erythemal region only a very small output of visible radiations, and a peak of emission at about 3190 A. U. comprising grinding together calcium carbonate, di-ammonium acid phosphate, and enough tertiary magnesium phosphate so that it appears as from 4% to 12% in solid solution in the phosphor produced, firing at about 300° C., grinding for about one half hour, refiring at 300° C. for one hour, grinding for one hour with an activating admixture of thallium sulphate, firing the mixture at 950° C. for ¾ hour, and refiring a number of times for 15 minute intervals until the maximum output is obtained.

14. A generator of ultra-violet radiations especially rich in the erythemal band and including a considerable proportion of bactericidal energy, but essentially free of visible luminescence, comprising a low-pressure mercury-vapor discharge device whose radiation is rich in energy of 2537 A. U. wave-length, and which includes a sealed envelope of glass impermeable to radiations of wave-length shorter than about 2600 A. U., but which transmits ultra-violet radiation of longer wavelength, in combination with a coating on its interior surface of fluorescent calcium magnesium orthophosphate, activated by thallium, and excitable by the 2537 A. U. energy to the emission of radiation of erythemal wave-lengths between 2800 and 3200 A. U., the proportion of the magnesium orthophosphate component in the finished phosphor being in the range from 4% to 12%, and thereby causing the peak of the spectrum emitted by said generator to shift, from beyond the range of erythemal effectiveness of said radiations, towards shorter wave-lengths, so as to actually lie at about 3190 A. U., to greatly increase the bactericidal efficiency and erythemal efficiency, as compared with that of a corresponding generator having a phosphor of merely magnesium-free fluorescent calcium orthophosphate, activated by thallium.

15. A generator of ultra-violet radiations especially rich in the erythemal band and including a considerable proportion of bactericidal energy, but essentially free of visible luminescence, comprising a low-pressure mercury-vapor discharge device whose radiation is rich in energy of 2537 A. U. wave-length and which includes a sealed envelope of glass impermeable to radiations of wave-length shorter than about 2600 A. U., but which transmits ultraviolet radiations of longer wave-length, in combination with a coating on its interior surface of fluorescent calcium magnesium orthophosphate activated by thallium and excitable by the 2537 A. U. energy to the emission of radiation of erythemal wave-lengths between 2800 and 3200 A. U., the proportion of the magnesium orthophosphate component in the finished phosphor being the range from 4% to 12%, and thereby causing the peak of the emitted spectrum to shift from beyond the range of erythemal effectiveness of said radiations toward the shorter wave-lengths so as to actually lie within the erythemal effectiveness spectrum, thereby greatly increasing the efficiency of generation of such radiations as compared with that of a corresponding generator having a phosphor of magnesium-free thallium activated calcium orthophosphate.

16. A generator of ultra-violet radiations especially rich in the erythemal band and including a considerable proportion of bactericidal energy, but essentially free of visible luminescence, comprising a low-pressure mercury-vapor discharge device whose radiation is rich in 2537 A. U. wave-length and which includes a sealed envelope of glass impermeable to radiations of wave-length shorter than about 2600 A. U., but which transmits ultra-violet radiations of longer wave-length, in combination with a coating on its interior surface of fluorescent calcium magnesium orthophosphate activated by thallium and consisting essentially of the fired reaction product of the following ingredients in about the stated proportions: tertiary magnesium phosphate, .608 mole, calcium carbonate, 14.51 moles, di-ammonium acid phosphate, 9.67 moles, and tertiary thallium phosphate, .173 mole; said coating being excitable by the 2537 A. U. wave-length to the emission of radiation in erythemal wave-lengths between 2800 and 3200 A. U. the magnesium causing the peak of the emitted spectrum to shift toward the shorter wavelengths, from beyond, to actually be within, the range of erythemal effectiveness, thereby increasing the efficiency of generation of such radiations, as compared with that of a magnesium - free thallium - activated calcium orthophosphate.

17. A generator of ultra-violet radiations especially rich in the erythemal band and including a considerable proportion of bactericidal energy, but essentially free of visible luminescence, comprising a low-pressure mercury-vapor discharge device whose radiation is rich in 2537 A. U. wave-length and which includes a sealed envelope of glass impermeable to radiations of wave-length shorter than about 2600 A. U., but which transmits ultra-violet radiations of longer wave-length, in combination with a coating on its interior surface of fluorescent calcium magnesium orthophosphate activated by thallium and consisting essentially of the fired reaction product of the following ingredients in about the stated proportions: tertiary magnesium phosphate, 165 parts, calcium carbonate, 1451 parts, di-ammonium acid phosphate, 1277 parts, and thallium sulphate, 129 parts; said coating being excitable by the 2537 A. U. wave-length to the emission of radiation in erythemal wave-lengths between 2800 and 3200 A. U. the magnesium causing the peak of the emitted spectrum to shift toward the shorter wave-lengths, from beyond, to actually be within, the range of erythemal effectiveness, thereby increasing the efficiency of generation of such radiations, as compared with that of a magnesium-free thallium-activated calcium orthophosphate.

RUDOLPH NAGY.
ROBERT W. WOLLENTIN.

REFERENCES CITED

The following references are of record in the file of this patent:

UNITED STATES PATENTS

| Number | Name | Date |
|---|---|---|
| 2,049,765 | Fischer | Aug. 4, 1936 |
| 2,417,038 | Clapp | Mar. 4, 1947 |
| 2,447,210 | Roberts | Aug. 17, 1948 |